United States Patent [19]
Alexander et al.

[11] Patent Number: 5,346,155
[45] Date of Patent: Sep. 13, 1994

[54] BELT DRIVEN CARTRIDGE WITH MAGNETIC BRAKE ASSEMBLY

[75] Inventors: Jerry L. Alexander, St. Paul Park; Durkee B. Richards, Stillwater; Glenn R. Gaster, Plymouth, all of Minn.

[73] Assignee: Minnesota Mining and Manufacturing Company, St. Paul, Minn.

[21] Appl. No.: 987,113

[22] Filed: Dec. 4, 1992

Related U.S. Application Data

[63] Continuation-in-part of Ser. No. 876,396, Apr. 30, 1992, abandoned.

[51] Int. Cl.⁵ .......................................... G11B 23/087
[52] U.S. Cl. ................................ 242/334; 226/195; 242/342
[58] Field of Search .............. 242/192, 197, 204, 75.2; 226/195; 360/132

[56] References Cited

U.S. PATENT DOCUMENTS

| | | | |
|---|---|---|---|
| 2,610,806 | 9/1952 | Lathrop | 242/75.2 |
| 3,417,937 | 12/1968 | Van Slageren | 242/202 |
| 3,620,473 | 11/1971 | Stone | 242/192 |
| 3,692,255 | 9/1972 | Von Behren | 242/192 |
| 4,162,051 | 7/1979 | Doby | 242/201 |
| 4,162,774 | 7/1979 | Bowers | 242/192 |
| 4,198,013 | 4/1980 | Anglin et al. | 242/192 |
| 4,225,098 | 9/1980 | Henkler et al. | 242/192 |
| 4,455,001 | 6/1984 | Schitke et al. | 242/192 |
| 4,456,160 | 6/1984 | Schoettle et al. | 226/195 |
| 4,801,853 | 1/1989 | Lewis et la. | 242/204 |
| 4,832,283 | 5/1989 | Treff et al. | 242/192 |

FOREIGN PATENT DOCUMENTS

| | | |
|---|---|---|
| 188362A1 | 7/1986 | European Pat. Off. . |
| 9101648.7 | 7/1971 | Fed. Rep. of Germany . |
| 2401861 | 3/1979 | France . |
| 2452452 | 10/1980 | France . |
| 63-114471 | 7/1988 | Japan . |
| 3-94685 | 9/1991 | Japan . |

OTHER PUBLICATIONS

*The English language counterpart is USSN 07/488,243 filed on Mar. 5, 1990. That application has been abandoned in favor of continuation-in-part application USSN 07/765,954 still pending in the USPTO.

Primary Examiner—Daniel P. Stodola
Assistant Examiner—John Q. Nguyen
Attorney, Agent, or Firm—Gary L. Griswold; Walter N. Kirn; Eric D. Levinson

[57] ABSTRACT

A data cartridge of the type in which magnetic recording tape is reversibly driven from one spool to another by an endless elastic drive belt contacting the periphery of the tape spools, a drive roller, and two located rollers at opposite corners of the cartridge. Tape tension and drive force are controlled by predetermined drag resulting from magnetic brakes built into the corner rollers.

12 Claims, 2 Drawing Sheets

BELT DRIVEN CARTRIDGE WITH MAGNETIC BRAKE ASSEMBLY

This is a continuation-in-part of application Ser. No. 07/876,396 filed on Apr. 30, 1992, now abandoned.

FIELD OF THE INVENTION

The present invention relates to a belt driven data cartridge and, in particular, to belt guide rollers used therein.

BACKGROUND OF THE INVENTION

The belt driven data tape cartridge of Von Behren, U.S. Pat. No. 3,692,255, has become a standard interface with computers where streaming and other off-line data back-up operations require rapid acceleration and deceleration of the tape. In these tape cartridges, a belt is driven by a drive roller along a belt path which includes a portion of the peripheries of the drive roller, a supply spool, a take-up spool, and two corner guide rollers positioned adjacent the tape spools, thereby reversibly driving the tape from spool to spool. A tape path extends between the spools and along one edge of the cartridge at which access to the tape and drive roller is provided.

Belt driven tape cartridges must meet minimum tape tension specifications while simultaneously operating within maximum allowable drive force specifications. The tape tension must not fall below a certain level as the tape passes from spool to spool or contact between a read/write head and the tape will be insufficient to allow successful data transfer. The minimum tape tension should thus be as high as possible but, conversely, the maximum drive force, i.e., the force applied to rotate the cartridge drive roller, should be as low as possible so as to allow the use of an inexpensive, low-power motor in the associated drive. As these parameters are dependent on friction within the cartridge, all friction sources must be controlled. Furthermore, in the case of the corner rollers, it is desirable to maintain some non-zero level of friction between the rollers and their pivot pins.

It is known that drag in the corner roller produces a differential in belt tension which in turn produces the required tension in the tape. The latter tension is produced because tension in the portion of the belt that presses on the take-up spool, being stretched by the drive roller, causes the belt to move slightly faster and that spool to similarly rotate slightly faster than the nominal belt speed. Conversely, as the belt is basically pushed by the drive roller and hence compresses as it contacts the supply spool, the belt there moves slightly slower and thus causes that spool to rotate slightly slower. The most common method of producing such belt drag is to apply friction to the belt or to the corner rollers about which the belt extends. In the vast majority of such cartridges, and as disclosed in the aforementioned U.S. Pat. No. 3,692,255 (Von Behren), a controlled predetermined frictional coupling is provided between the corner rollers and their respective support shafts.

It has also been disclosed to utilize other techniques for restricting rotation of the corner rollers to produce controlled drag on the belt. For example, in U.S. Pat. No. 4,198,013 bowed washers are proposed to be spring-loaded on the corner roller support shafts so as to bear against the rollers to create drag. In U.S. Pat. No. 4,162,774, rubber-like, elastomeric cores are proposed to be provided within the corner rollers. These cores would then be deformed at changing regions as the roller rotates to produce a hysteresis energy loss and therefore a drag on the belt.

Most commonly, however, the drag has been provided by appropriately dimensioning and lubricating the corner roller/support shaft interface. As such lubricants may change in viscosity over the life of the cartridge or may migrate from the interface, oil-retaining structures have been proposed (Jap. Kokai No. 63-114471). An oriented, controlled texture including axial splines is disclosed in German Patent Appln. No. G-9101648.7.

SUMMARY OF THE INVENTION

In contrast to all such prior techniques for controlling the drag on such corner rollers and in which the tension has always been marginally controllable over the extended life of the cartridges due to wear, as in the use of bowed washers or changes in quantity or viscosity of lubricants, the present invention is directed to a technique in which a magnetic brake is utilized.

The present invention thus comprises a belt driven data cartridge of the type in which a magnetic recording tape wound on a pair of tape spools, each mounted on a shaft affixed to a baseplate, is reversibly driven from one of the spools to the other by a thin, continuous flexible belt in contact with the periphery of each spool, and tension maintaining the belt in driving contact with the respective spools is provided by stretching the belt around at least a portion of the periphery of a drive puck, the respective spools, and at least one guide roller. Preferably, two corner rollers are included, each being positioned at an opposite corner of the cartridge. In this cartridge, each of the corner rollers includes an outer periphery structured to contact the drive belt, an inner periphery structured to rotate on a shaft fixed to said base, and, in combination with the base, includes a magnetic brake assembly for controllably resisting rotation of the roller, thereby imparting controlled tension on the belt.

Preferably, each corner roller comprises a molded plastic body having an inner sleeve defining a bore adapted to receive and rotate about the base-mounted shaft. The body further has interior walls defining a recess, within which is coaxially mounted a permanent magnet assembly which forms a first part of the magnetic brake assembly. The other part of the brake assembly comprises a magnetizable member which is part of the base and extends radially around the shaft. Means are also provided for separating a top surface of the magnetizable member from the permanent magnet assembly such that rotation of the roller and magnet assembly mounted therein with respect to the magnetizable member imparts a predetermined amount of drag, resisting rotation of the roller.

In a further preferred embodiment, the magnetizable member is formed of a remanently magnetizable material which, in combination with the permanent magnet assembly, forms a hysteresis brake.

BRIEF DESCRIPTION OF THE DRAWINGS

The novel features and advantages of the present invention will become more apparent to those skilled in the art upon consideration of the following detailed description which refers to the accompanying drawings; wherein.

DETAILED DESCRIPTION

Figure 1:
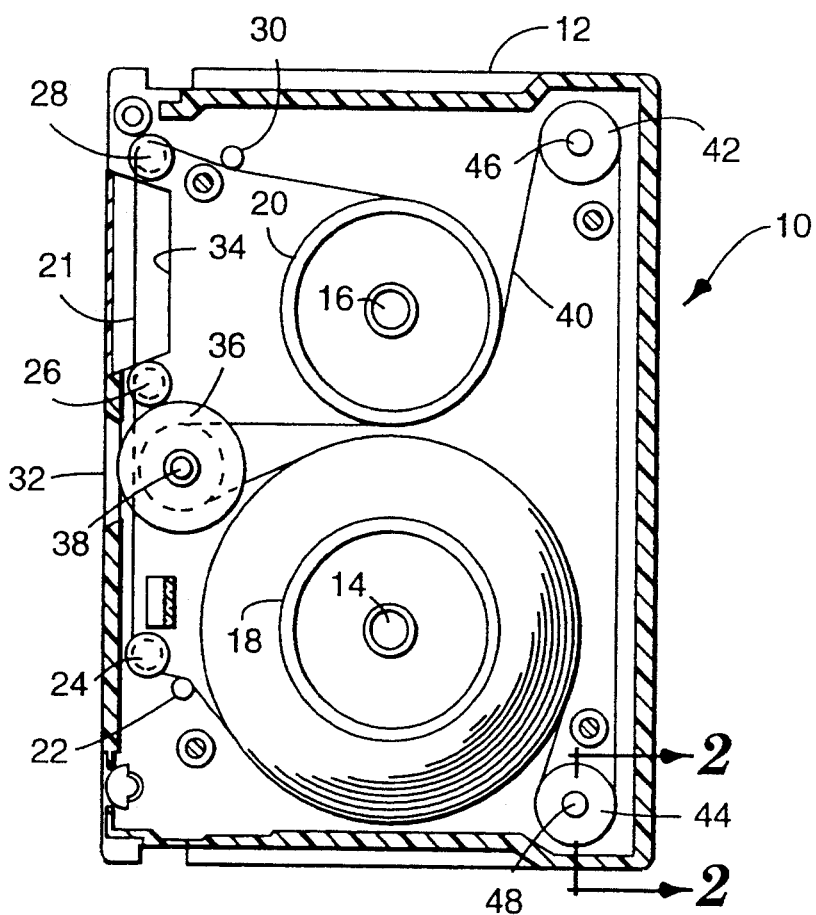
FIG. 1 is a top view of a belt-driven data tape cartridge incorporating corner guide rollers according to the present invention.

As shown in FIG. 1, a data cartridge 10, according to the present invention, includes a baseplate 12 on which are mounted a plurality of support pins or shafts which support the respective belt and tape guiding members of the cartridge. Thus, for example, tape spool support shafts 14 and 16 are mounted toward the center of the baseplate 12 to support supply and take-up spools 18 and 20, thus allowing the tape 21 to pass along a tape transport path from the supply spool 18, passing a first tape wrap pin 22, a first tape guide 24, a center guide 26, a second tape guide 28, and a second tape wrap pin 30, and thence to take-up spool 20. The tape transport path extends along a front face 32 of the cartridge, which face includes a cut-out portion 34 normally protected by an openable door so as to allow access at that opening for a tape record/playback transducer. (The cartridge cover, which includes the head access door, is not shown in FIG. 1.)

The magnetic tape 21 mounted on the spools 18 and 20, respectively, is driven from spool to spool via a drive system which includes a drive roller 36 mounted for free rotation on a drive roller pin 38 adjacent the front face 32 where it may be contacted by a drive puck in a tape drive. The drive roller 36 in turn drives a drive belt 40 along a belt path extending around the drive roller 36, corner rollers 42 and 44, which in turn are rotatably mounted on the corner roller support pins 46 and 48, respectively, and past the periphery of the tape packs wound on the tape spools 18 and 20. The corner roller pivot pins 46 and 48 are typically formed of polished, hardened steel.

The drive belt 40 is made of a thin, continuous, flexible and elastic material, such as polyurethane. The unstretched length of the drive belt 40 is slightly less than the length of the belt path. Thus, when the belt 40 is stretched around the respective members defining the path, it generates a belt tension which provides a frictional engagement force or side load between the corner rollers 42 and 44 and their respective pivot pins 46 and 48, as well as between the belt 40 and the tape packs on the tape spools 18 and 20. This frictional engagement force both also presses the tape layers together to prevent the tape packs on the spools from slipping or spilling from the supply reel during operation. Since the frictional engagement force is dependent upon belt tension, the tape tension and drive force are in turn dependent upon the belt tension.

The belt guiding corner rollers 42 and 44 are positioned at opposite corners of the baseplate 12 along a back edge parallel to the front edge 32. The corner rollers in the prior art cartridges are constructed to have a predetermined, non-zero coefficient of friction to provide a predetermined frictional coupling between each corner roller and its pivot pin. It is at this point that the present invention deviates from that of the prior art. The present invention is more clearly shown with reference to FIG. 2, which is an exemplary cross-section of corner roller 44. As described previously, the roller 44 is rotatably mounted on a pivot pin 48, which in turn is precisely positioned in the baseplate such that the corner roller 44 rotates along an axis perpendicular to the baseplate. The roller 44 is there shown to include a molded plastic body 50 having an external periphery 52, against which the drive belt 40 is carried. The roller 44 also has an inner sleeve 53 which defines an inner periphery 54 which bears against the pivot pin 48. Finally, a permanent magnet 56 and a magnetically soft steel washer 58, making up a permanent magnet assembly, are carried within a cavity in the lower portion of the roller. These magnetic components make up the first part of the magnetic brake-controlled cartridge of the present invention.

The remaining component of that brake is the magnetizable washer 60 which is adhered by a layer of adhesive 62 to the baseplate 12. The inner sleeve 53 of the corner roller 44 is constructed to extend below the surface of the lower surface of the magnet 56 and bear against the upper portion of the magnetizable marker 60, thereby providing a thrust-bearing surface which separates the magnet 56 from the washer 60 while allowing magnetic coupling therebetween.

Figure 2:
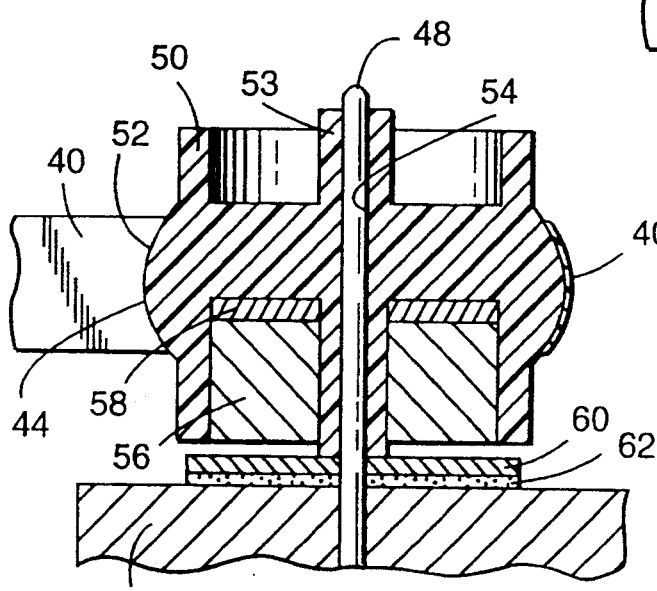
FIG. 2 is a cross-sectional view of a corner roller according to the present invention (not to scale)
Figure 3:
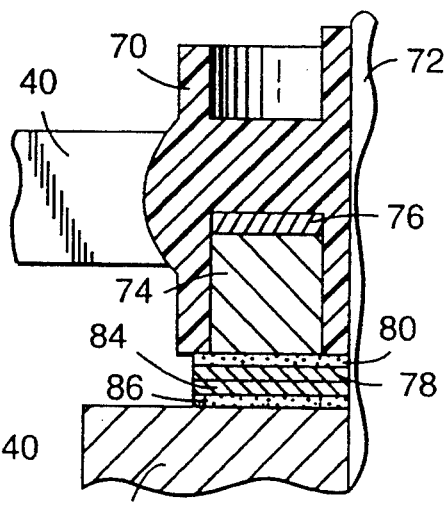
FIG. 3 is a partial cross-section view of another embodiment of a corner guide roller according to the present invention.

An alternative to such a lower support for the roller, as described above, is set forth in FIG. 3. In this view, the corner roller 70 is rotatably mounted on support pin 72, and also contains a permanent magnet 74 and a flux return washer 76, both mounted within a cavity in the roller 70. The magnetic brake similarly provides on a baseplate 82 a magnetizable element, washer 84, which is bonded to the baseplate 82 by an adhesive 86. In contrast to the embodiments shown in FIGS. 1 and 2, the roller 70 in FIG. 3 further comprises a non-magnetic bearing washer 78 which is bonded to the roller 70 by an adhesive 80. In this embodiment, the bearing washer 78 extends over at least a portion of the bottom surface of the roller 70 and bears directly against the surface of the magnetizable washer 84, thus eliminating the air gap as shown in FIG. 2. In this manner, the magnetic brake further provides the function of a thrust beating in which controllable drag results as the bearing washer 78 rotates against the upper surface of the magnetizable washer 84. This source of drag can be adjusted by both changing the area of contact and the coefficient of friction between the opposed surfaces.

As the hysteresis part of the corner roller drag, which has no mechanical contact, is approximately 50 percent of the total drag, the total drag is expected to be very repeatable from cartridge to cartridge, to be independent of speed and temperature, and not expected to change significantly over the life of the cartridge. It is expected that the corner rollers of the present invention will thus markedly improve both the consistency of the drive force required to drive the cartridges and the consistency of the tape tension over all operational environments and, at the same time, significantly increase the effective life of the cartridges.

Figure 4:
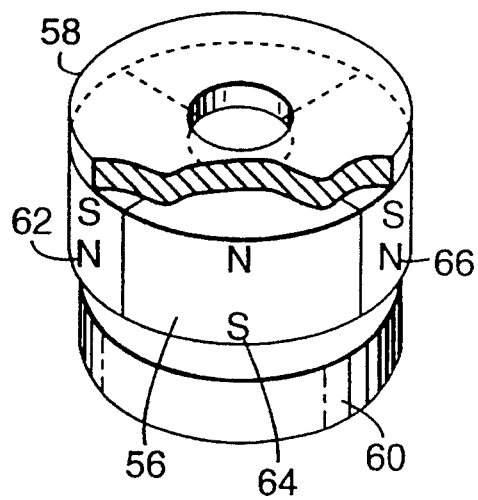
FIG. 4 is a perspective view of a permanent magnet and flux control members forming a hysteresis brake used in the corner guide rollers according to one embodiment of the present invention.

Details of the permanent magnet and associated magnetic members making up the magnetic brake described in FIG. 2 are set forth in FIG. 4. As may there be seen, the brake comprises a permanent magnet 56, a magnetic shunt, or flux return member 58, and a magnetizable member 60. The magnet 56 is preferably formed of an annular ring of a permanent magnet material magnetized to have four axially extending magnetic dipoles presenting alternate poles 62, 64, 66 (and a fourth not shown in that figure) at the bottom of the magnet. Such a magnet is desirably formed of known permanent magnet materials such as either sintered or bonded (both flexible and rigid bonded types) barium ferrite or neodymium alloys. The magnetic shunt 58 provides an improved flux return path and is selected of a low coercive force steel. In a preferred design, the shunt keeps the magnetic field emerging from the corner roller to approximately 30 oersteds.

Finally, the magnetizable washer 60 is made preferably of a relatively hard magnetic material, such as Vicalloy I (10% V, 52% Co, and the balance Fe), treated to have a coercive force about 230 oersteds. In such an embodiment, the magnetic brake is a form of a hysteresis brake, as the magnet 56 constantly alternates the magnetic states of the washer 60 as the roller rotates.

It is generally recognized that the area of the hysteresis loop of a magnetizable material defines the energy dissipated each time the magnetization in the material is made to traverse completely around the hysteresis loop. Thus, in the present invention, the area of the loop of the material selected for the washer 60 and the number of poles on the magnet 56 determine the amount of energy dissipated during each full revolution of the corner roller 44. This energy dissipation per revolution in turn determines the hysteresis drag torque generated by the corner roller. As long as such a magnetic material washer is operating in a mode of magnetic saturation, two parameters primarily control the area of the hysteresis loop, first, the volume of the washer itself and, second, the magnetic properties of the washer. In particular, it has been noted that so long as the thickness of the washer 60, the intensity of the external field provided by the magnet 56, and the relative spacing therebetween, are selected to ensure that the washer is repeatedly magnetically saturated as the magnet 56 rotates adjacent to it, relatively little change in the drag force occurs even though the air gap between the magnetizable washer and the magnet was varied over a range from about 2 to 12 mils (0.051–0.31 mm).

The magnetic brake implemented corner roller of the present invention has been described hereinabove with reference to the use of a magnetic washer made of a remanently magnetizable material, thus forming a hysteresis-type magnetic brake. It is also known that the magnetic member, such as element 60 and 84, may also be formed of a soft magnetic iron alloy such as permalloy or the like. Such a material is generally regarded as not being remanently magnetizable, and, in such case, as the area under its hysteresis loop is relatively small, the amount of hysteresis braking provided by such an embodiment may be appreciably less. However, as such a material is highly conductive it may still function as an eddy current brake as a result of currents induced within the element as a result of the changing flux passing through it. Similarly, instead of using a magnetic washer, whether or not remanently magnetizable, a non-magnetic, but conductive material may also be used. Thus, for example, in such an embodiment the aluminum baseplate of the data cartridge itself may be sufficient. In such an embodiment, the magnetic brake becomes a form of an eddy current brake in which electrical currents induced in the electrically conducting portion of the baseplate below the magnet as a result of the changing flux patterns will create a desired drag, inhibiting free rotation of the roller. In the latter embodiment, the amount of drag produced is speed dependent and therefore may not be as preferred as those discussed earlier.

Figure 5:
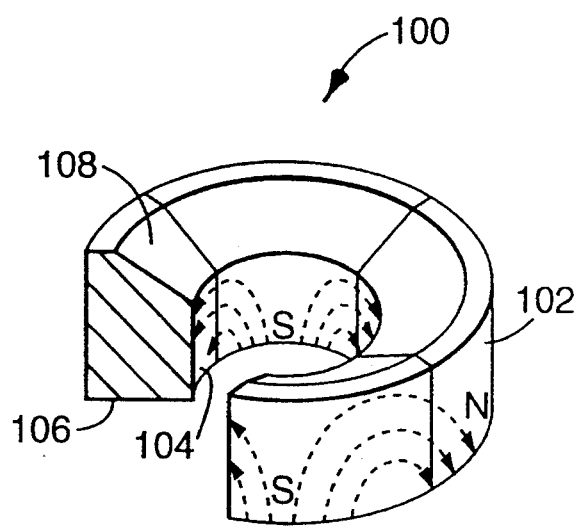
FIG. 5 is a perspective view of a permanent magnet according to another embodiment of the corner guide roller of the present invention.

In another embodiment of the present invention, the magnet 56 can be configured like a magnet 100 shown in FIG. 5. The magnet 100 has an outer periphery 102, an inner periphery 104, a lower surface 106, and an upper surface 108. The magnet 100 is thicker at the outer periphery 102 than at the inner periphery 104. The thickness of the magnet 100 tapers from the outer periphery 102 to the inner periphery 104 along the upper surface 108.

When the magnet 100 is magnetized, it is magnetized such that the magnetic field lines will curve around from one bottom face pole to the next within the thickness of the magnet. This eliminates the need for a magnetic shunt such as the shunt 58 used in conjunction with the magnet 56, as shown in FIG. 4. If the magnet 100 is too thin, the longer field lines will be forced to pass through the air causing a loss in magnetic field strength. If the magnet is thicker than necessary, then the magnet will cost more with no corresponding increase in strength. The magnet 100 is preferably thicker at its outer periphery 102 than at its inner periphery 104 because the optimum thickness of the magnet is a function of the distance between adjacent magnetic pole centers, which is larger for the outer periphery 102 of the magnet than for the inner periphery 104.

Preferred materials for the magnet 100 include unoriented, isotropic barium ferrite or neodymium magnets. One such magnetic material is neodymium 2002-B or -D available from 3M Company, St. Paul, Minn., having a magnetic energy product of 5 Megagauss-oersteds. In the alternative, the magnet 100 can include neodymium, barium ferrite, or strontium ferrite which is preferentially oriented during molding. The magnetization field can then be applied later to match the orientation pattern.

For a mini-size data cartridge corresponding to DC-2000 Data Cartridges manufactured by 3M Company, the magnet 100 is preferably about 141 mils (3.6 mm) thick at the outer periphery 102 and tapers to a thickness of 85 mils (2.2 mm) at the inner periphery 104. Thus, the inner periphery 104 is about 3/5 as thick as the outer periphery 102. The outer periphery 102 preferably has a diameter of about 355 mils (9.0 mm) and the inner periphery 104 preferably has a diameter of about 190 mils (4.8 mm).

The magnet 100 can be assembled into the corner roller by insert molding or by the use of an epoxy. The magnet 100 can then be magnetized from the lower surface 106 after the magnet has been inserted into the corner roller.

The advantages of the hysteresis brake provided in the corner rollers of the present invention over that provided in the lubrication brake rollers of the prior art is readily apparent from the following examples:

EXAMPLE 1

Corner rollers used in 4×6 inch standard size data cartridges were modified to include a magnetic brake assembly such as that shown in FIG. 2. In these modifications a permanent magnet was formed of injection molded barium ferrite having an inner diameter of 0.25 inches (6.4 mm) and an outer diameter of 0.55 inches (14 mm), magnetized to have four axially extending dipoles. This magnet was used in conjunction with a shunt of soft steel 23 mils (0.58 mm) thick. A magnetizable washer made of Vicalloy I, having a thickness of about 15 mils (0.38 mm), an inner diameter of 0.094 inches (2.4 mm) so as to fit closely to the pivot pin, and an outer diameter of 0.55 inches (14 mm) was bonded to the baseplate.

The shunt and permanent magnet were pressed into the corner roller so that the bottom of the magnet was flush with the outside edge of the roller. The inner sleeve extended below the magnet so as to bear directly against the Vicalloy I washer. The spacing between the permanent magnet and the washer was controlled by the projection of the sleeve to be about 8 mils.

Such a design has three sources for producing drag:

a) the journal bearing effect, which was reduced as much as possible by using a smaller diameter pin than that used in prior art data cartridges and by using a low viscosity lubricant;

b) the hysteresis brake as described above, which was optimized for maximum drag; and c) the thrust-bearing drag produced as a result of the magnetic attraction force between the corner roller and the magnetic washer, which causes the lower edge of the sleeve to be in frictional contact with the washer. This effect was not optimized in the modified cartridges produced as shown in FIG. 2.

In repeated tests of these modified cartridges, the tape tension was found to remain at a substantially constant value of about 2 ozs. over changes in tape speed ranging from 30 to 120 inches per second. The same tape tension in an otherwise identical, standard cartridge varied from a minimum value of about 1 oz. up to over 3.5 ozs. at the high speeds. Similarly, the drive force required to run the cartridges utilizing the hysteresis brake aided corner roller remained substantially constant at about 3.5 ozs. The drive force for the standard cartridges varied from slightly less than 3 ozs. to over 4 ozs. As the hysteresis drag was found to be essentially constant over temperatures ranging between 5°–45° C., smaller pin diameters and low viscosity lubricants were used to further improve the independence of tape tension and drive force as a function of temperature. In standard cartridges the drive force at 5° C. was about 35% more than that in the hysteresis brake cartridges.

The dependence of the tape tension and drive force on the nature of the corner roller was also dramatically evident in tests determining the drag as a function of the speed of the corner rollers alone. Thus, when the drag of the corner rollers alone was measured, the drag for the hysteresis implemented corner roller was found to remain substantially constant at slightly less than 1 oz. over equivalent tape speeds ranging from 30 to 120 inches per second. In contrast, the drag for standard lubricated corner rollers varied from less than 0.6 oz. to greater than 1.3 ozs. over the same speed range.

EXAMPLE 2

In another series of tests, rollers utilizing the hysteresis brake described above were installed in mini-size data cartridges corresponding to DC-2000 Data Cartridges manufactured by 3M Company.

In this series of tests, because of the smaller size of the corner rollers utilized in the mini-cartridges, the resultant permanent magnet used in the corner rollers similarly had to be smaller diameter. Therefore, to generate the desired external magnetic field appropriate to create the requisite drag, a more intense, permanent magnet material was desirably selected. Thus, in this series of cartridges, a neodymium permanent magnet was utilized in which the inner diameter of magnet was 0.19 inches (4.8 mm), the outer diameter was 0.36 inches (9.1 mm), and the magnet was magnetized as described above to have four, axially extending magnetic dipoles. A magnetic shunt washer 0.19 inches (4.8 mm) ID, 0.36 inches (9.0 mm) OD, and 0.27 mils (0.69 mm) thick formed of Low Carbon #1020 steel was also used. Also a Vicalloy I magnetizable washer 0.094 inch (2.4 mm) ID, 0.37 inch (9.3 mm) OD, and 16 mils (0.41) mm thick was separated 8 mils (0.20 mm) from the magnet by the projecting sleeve.

In testing it was found that the hysteresis brake corner roller implemented mini-cartridges displayed 0.4 oz. less drive force at 5° C., and 0.9 oz. higher tape tension at 45° than that observed in standard mini-cartridges of otherwise identical construction. The hysteresis implemented corner rollers have thus been found to make both the large and mini-cartridges less sensitive to changes in both speed and temperature.

Again, as the magnet is used in a closed magnetic circuit so that only a small leakage field extends beyond the edge of the corner roller, such a field was found not to exceed about 70 oersteds and to have no effect on the magnetic tapes utilized in such cartridges.

Numerous characteristics, advantages, and embodiments of the invention have been described in detail in the foregoing description with reference to the accompanying drawing. However, the disclosure is only illustrative and the invention is not limited to the precise illustrated embodiments. Thus, for example, the Vicalloy I magnetic washer described in FIGS. 2, 3, and 4 may be substituted with other remanently magnetizable materials such as Chromindur II (approximately 28% Cr, 10% Co, and the balance Fe), or Arnokrome III (approximately 28% Cr, 8% Co, and the balance Fe), both manufactured by Carpenter Steel, alloys, and the like. Similarly, the permanent magnet may be made of either sintered or flexible or rigid bonded magnet constructions and made of a variety of known commercially-available permanent magnet materials such as barium ferrite, neodymium alloys, AlNiCo materials, and the like. Also, while a homogeneous magnet magnetized to exhibit a desired number of dipoles is believed to be preferred, an assembly of discrete magnets may also be utilized. Other configurations of hysteresis brakes utilizing differently aligned magnetic dipoles and configurations of the respective components may also be utilized. While the present invention has been illustrated with regard to belt driven data cartridges of the type first described in U.S. Pat. No. 3,692,255 (Von Behren), the present invention may also be used with other types of belt-driven data cartridges. Various changes and modifications may be effected therein by one skilled in the art without departing from either the spirit or scope of the present invention.

What is claimed is:

1. A belt driven data cartridge of the type in which a magnetic recording tape wound on a pair of tape spools, each mounted on a shaft affixed to a base, is reversibly driven from one said spool to the other by a thin, continuous flexible belt in contact with the periphery of each said spool, and tension maintaining the belt in driving contact with the respective spools is provided by stretching the belt around at least a portion of the periphery of a drive puck, the respective spools, and at least one roller, wherein said roller includes an outer periphery structured to contact said drive belt, an inner sleeve defining a bore structured to rotate on a shaft fixed to said base and in combination with said base, a magnetic brake assembly for controllably resisting rotation of the roller, thereby imparting controlled tension on said belt, said roller further having interior walls defining a recess, and within said brake assembly comprises a permanent magnet assembly mounted coaxially with said bore within said recess, a magnetizable member which is part of the base and extends radially around and coaxially with said shaft, and means for separating a top surface of said magnetizable member a predetermined distance from said permanent magnet assembly such that rotation of the roller and magnet assembly mounted therein with respect to the magnetizable member imparts a predetermined amount of drag resisting said rotation.

2. The cartridge of claim 1, wherein said magnetizable member comprises a remanently magnetizable material which, in combination with said permanent magnet assembly, provides a hysteresis brake.

3. The cartridge of claim 1, wherein said separating means comprises an extension of said inner sleeve which extends beyond said permanent magnet assembly so as to contact said base and prevent magnetic attraction forces from causing said permanent magnet assembly to contact said magnetizable member.

4. The cartridge of claim 1, wherein said separating means comprises a non-magnetic washer coaxially affixed to the exposed face of the permanent magnet assembly and adapted to rotate against the face of the magnetizable member, magnetic attraction forces between the magnet assembly and magnetizable member thereby pressing the non-magnetic washer into frictional contact with the magnetizable member so as to provide a thrust bearing which also functions to provide a predetermined drag, depending on the magnetic attraction forces and frictional coupling at the rotating surfaces.

5. The cartridge of claim 1, wherein said roller is formed of molded plastic and has an inner sleeve defining said bore axially extending so as to bear against a top surface of the magnetizable member adjacent said shaft, in combination forming a thrust bearing opposing attractive forces between said magnet assembly and magnetizable member and defining a predetermined separation therebetween.

6. The cartridge of claim 4, wherein said magnetic brake assembly comprises a generally ring-shaped bonded magnet held within said roller and said magnetizable member comprises a washer of magnetically hard steel bonded to said base.

7. A belt driven data cartridge of the type in which a magnetic recording tape wound on a pair of tape spools, each mounted on a shaft affixed to a base, is reversibly driven from one said spool to the other by a thin, continuous flexible belt in contact with the periphery of each said spool, and tension maintaining the belt in driving contact with the respective spools is provided by stretching the belt around at least a portion of the periphery of a drive puck, the respective spools, and at least one roller, wherein said roller includes an outer periphery structured to contact said drive belt, an inner periphery structured to rotate on a shaft fixed to said base and in combination with said base, a magnetic brake assembly for controllably resisting rotation of the roller, thereby imparting controlled tension on said belt, wherein said brake assembly comprises a ring-shaped permanent magnet and a magnetizable member, the magnet being coaxially positioned within said roller and having a plurality of axially extending magnetic dipoles so as to present at a first face extending generally perpendicularly from the axis a plurality of alternating polarity magnetic poles, and wherein the magnetizable member is affixed to said base coaxial with said shaft and spaced a predetermined distance from said first face.

8. The cartridge of claim 7, further comprising a magnetic shunt coaxial with and adjacent to the opposing face of said magnet.

9. The cartridge of claim 7, wherein said magnet includes a plurality of discrete magnetic segments of alternating polarity.

10. The cartridge of claim 7, wherein said magnet comprises a homogeneous bonded magnet magnetized to have at least two, alternate polarity, axially extending, magnetic dipoles.

11. The cartridge of claim 7, wherein said ring-shaped permanent magnet is thicker at its outer periphery than at its inner periphery.

12. The cartridge of claim 11, wherein the inner periphery of said magnet is about 3/5 as thick as the outer periphery of said magnet.

* * * * *

UNITED STATES PATENT AND TRADEMARK OFFICE
CERTIFICATE OF CORRECTION

PATENT NO. : 5,346,155
DATED : September 13, 1994
INVENTOR(S) : Alexander, et. al.

It is certified that error appears in the above-indentified patent and that said Letters Patent is hereby corrected as shown below:

Column 4, line 47, "beating" should read --bearing--.
Column 9, line 10, "within" should read --wherein--.
Column 10, line 3, "claim 4" should read --claim 1--.

Signed and Sealed this

Eighteenth Day of April, 1995

Attest:

BRUCE LEHMAN

Attesting Officer

Commissioner of Patents and Trademarks